United States Patent Office 3,483,273
Patented Dec. 9, 1969

3,483,273
GRAFT COPOLYMERS OF UNSATURATED
HYDROCARBON INTERPOLYMERS
Paul J. Prucnal, Cheswick, and Marco Wismer and
Roger M. Christenson, Gibsonia, Pa., assignors to
PPG Industries, Inc., a corporation of Pennsylvania
No Drawing. Filed Mar. 31, 1966, Ser. No. 538,989
Int. Cl. C08f 15/40
U.S. Cl. 260—878
14 Claims

ABSTRACT OF THE DISCLOSURE

Graft copolymers are prepared by polymerizing at least one ethylenically unsaturated monomer in the presence of an interpolymer of at least one monoolefin and a cyclic polyene, said interpolymer having an intrinsic viscosity of 0.6 or lower, and at least about 3.5 percent by weight of ethylenic unsaturation in the polymer molecule.

---

This invention relates to graft copolymers of polyunsaturated hydrocarbon-monoolefin interpolymers containing unsaturated groups, and more particularly to graft copolymers made by the graft copolymerization of ethylenic monomers with such interpolymers.

Interpolymers of ethylene, propylene and similar ethylenic hydrocarbons with small amounts of interpolymerized polyunsaturated compounds are of increasing commercial interest. For the most part, such interpolymers are elastomers characterized by their rubbery properties, and in common with conventional rubbers, are cured by vulcanization, generally utilizing sulfur as the vulcanizing agent.

More recently, interpolymers of ethylenic hydrocarbons and polyunsaturated compounds have been obtained which contain appreciable residual unsaturation, sufficient, for example, to permit them to be cured by an oxidative mechanism in air. Interpolymers of this type are disclosed, for example, in copending applications Ser. No. 413,326, filed Nov. 23, 1964; Ser. No. 460,544, filed June 1, 1965; and Ser. No. 502,312, filed Oct. 22, 1965. These interpolymers contain a substantial proportion of polyunsaturated hydrocarbon, interpolymerized with one or more monoolefins having a single copolymerizable ethylenic group. They are obtained by polymerization in the presence of transition metal catalyst.

It has now been discovered that products of desirable properties and unique structure are obtained by the addition polymerization of ethylenic monomers in the presence of the aforesaid interpolymers to effect graft copolymerization of the ethylenic monomers with the ethylenic double bonded carbon atoms of the interpolymer. The resultant graft copolymers have varying properties and uses, depending upon the nature of the copolymer and the relative proportions of the components. Among the properties which can be obtained are better solubility characteristics in various classes of solvents, better stability, improved resistance to degradation by exposure to severe climatic conditions, and the like. Thus, the products are useful in generally the same manner as the aforesaid interpolymers, i.e. in coating compositions, adhesive compositions, to make foams, etc., and in addition can be employed in applications for which the interpolymers themselves are not entirely satisfactory.

The interpolymers utilized in the invention have several distinguishing characteristics, including the following:

(1) These interpolymers contain a comparatively high degree of functional unsaturation which permits them to be substantially cured if desired by an oxidative mechanism. (That is, a thin film of the interpolymer itself upon exposure to air and without added curing agents cures sufficiently to become tack-free and essentially insoluble in aliphatic hydrocarbons, such as heptane.) These interpolymers contain at least about 3.5 weight percent unsaturation, as defined below, and preferably contain at least about 4 percent or more. They may have up to about 25 weight percent unsaturation or even more.

(2) The interpolymers herein are of relatively low molecular weight, as indicated by their intrinsic viscosity. The intrinsic viscosity of the present interpolymers is preferably no higher than about 0.9, and usually is 0.6 or lower.

(Intrinsic viscosity is described, for example, in the book by Allen entitled "Techniques of Polymer Characterization," Butterworth Publications, Ltd., London, 1959; the values herein being measured in benzene at 25° C. using an Ubbelohde Dilution Viscometer.)

(3) The interpolymers employed are quite soluble in organic solvents, permitting them to be dissolved in appreciable concentrations while maintaining a usable solution viscosity. For example, there can be obtained solutions of the present interpolymers in benzene, xylene, aromatic naphtha, or other solvents containing as much as 70 percent or more resin solids and having a utilizable viscosity.

Many of the properties of these interpolymers are attributable in large part to their structures, which include an essentially saturated carbon chain as the polymer backbone, this chain containing a substantial proportion (i.e., 20 percent or more) of the total carbon atoms in the polymer molecule. Only a small amount of ethylenic unsaturation is in the polymer backbone, and this principally in terminal position, with at least a major part of the unsaturated linkages remaining in the polymer molecules being in pendant groups attached to the main polymer chain.

As indicated, the interpolymers prior to oxidation have at least about 3.5 percent by weight of unsaturation in the polymer molecule. "Percent by weight of unsaturation" as employed herein refers to the weight of groups of the structure

compared to the total weight of interpolymer. For instance, 2 percent by weight of unsaturation means 100 grams of interpolymer contain 2 grams of carbon present in groups of the structure

It may be noted that accurate determination of the extent of unsaturation in these products by common analytical techniques is quite difficult. For example, ordinary iodine value determinations have been found to be unreliable, and accurate analysis by chemical means in general requires very tedious and time-consuming procedures. One method which can be used is infrared spectroscopic examination, while another method for determining the extent of unsaturation is by means of nuclear magnetic resonance spectroscopy, such a method being described in the above-mentioned copending applications.

The proportions of the components of the interpolymer can be varied widely, it being necessary only to interpolymerize sufficient polyunsaturated hydrocarbon with the monoolefin or monoolefins to provide the desired level of unsaturation in the polymer, this amount varying with the particular polyunsaturated compound.

Among the polyunsaturated compounds that can be employed in producing the interpolymers utilized herein are various dienes and other polyenes. In order to obtain interpolymers of the structure and properties described above, dienes containing nonconjugated ethylenic groups, and to a lesser extent conjugated alicyclic dienes, are greatly preferred: Included among the polyunsaturated compounds that can be employed are cyclic polyenes, such as cycloalkadienes; substituted-norbornenes, e.g., 5 - alkenyl - 2 - norborne; norbornadiene (bicyclo[2.2.1]hepta-2,5-diene) and substituted-norbornadienes, e.g., 2-methyl norbornadiene and other 2-alkyl norbornadienes; unsaturated terpenes, such as limonene; and similar compounds. The polyene may contain substituents, such as halogen or oxygen-containing radicals, but in general it is preferred to employ unsubstituted hydrocarbons containing only carbon and hydrogen. Certain dienes exert a marked influence in lowering molecular weight, even when present only in very small amounts during polymerization. Norbornadiene and 4-vinyl-cyclohexene-1 have this effect.

Some representative examples of other specific polyunsaturated compounds that can be utilized are:

1,4-pentadiene
1,4-hexadiene
1,9-octadecadiene
11-ethyl-1,1-tridecadiene
1,3-cyclopentadiene
5-methyl-1,3-cyclopentadiene
Tricyclopentadiene
5-methyl-1,3-cyclopentadiene dimer
1,4-cyclohexadiene
1,5-cyclooctadiene
1,5,9-cyclododecatriene
1,4,6-cyclooctatriene
5-(2'-butenyl)-2-norbornene
5-(1,5-propenyl)-2-norbornene
5-methylene-2-norbornene
1,8(9)-p-menthadiene
Divinylbenzene
5-vinylbicyclo[2.2.1]hept-2-ene
Bicyclo[4.3.0]nona-3,7-diene Generally speaking, any monolefin having a single copolymerizable ethylenic group can be interpolymerized with the polyene. Suitable interpolymers for many purposes are made from interpolymerization of the polyunsaturated compound with only a single monoolefin, e.g., copolymers of ethylene and dicyclopentadiene, or propylene and dicyclopentadiene. For other purposes, it is preferred to employ interpolymers of at least two comonomers with the polyunsaturated compound. In either event, it is preferred that ethylene comprise a substantial proportion of the interpolymer, i.e., at least about 20 perment by weight. Classes of preferred interpolymers include copolymers of a nonconjugated diene and ethylene, and interpolymers of a nonconjugated diene, ethylene and at least one other monoolefin having a single terminal ethylenic group, such as propylene.

Of the large number of usable monoolefins, the preferred comonomers include those having the formula:

where R is an alkyl group having up to about 20 carbon atoms, or is an aryl radical and R' is hydrogen or alkyl of up to about 20 carbon atoms. Compounds of this class include, for instance, propylene, 2-methylpropene, 2-propylhexene-1, 1-butene, 4-methyl-1-pentene, 1-pentene, 1-hexene, 1-octene, 5-methyl-1-nonene, 5,6,6-trimethyl-1-decene, 1-dodecene, 1-tetradecene, 1-octadecene, styrene and vinyl toluene.

When two or more comonomers are utilized, their proportions are not critical since, as mentioned, copolymers of a single monoolefin with the polyunsaturated compound can be employed. The preferred proportions vary depending on the identity of the particular monomers. For example, interpolymers of ethylene, propylene and a nonconjugated diene such as dicyclopentadiene generally contain from about 10 percent to about 70 percent of ethylene, from about 10 percent to about 40 percent propylene, and from about 5 percent to about 50 percent of the diene, while preferred copolymers contain from about 20 percent to about 90 percent of ethylene and from about 10 percent to about 80 percent of a diene, such as dicyclopentadiene. It will be understood that the minimum usable amount of any diene depends to some extent upon its molecular weight. (The above percentages are by weight; the same is true of all parts and percentages throughout this specification unless otherwise specified.)

The interpolymerization of the foregoing monomers is carried out in the presence of a transition metal catalyst of the Ziegler type; examples of Ziegler catalysts (sometimes called Ziegler-Natta catalysts) are described in United States Patents Nos. 3,153,023; 3,159,615; 3,168,-504; and others. They generally involve interaction products of an alkyl aluminum compound and a transition metal compound. In making the interpolymers herein, a preferred catalyst is composed of an organic vanadium compound and an alkyl aluminum halide, with the organic vanadium compound being usually vanadium tris-(acetylacetonate) or vanadium oxybis(acetylacetonate). The alkyl aluminum halide co-catalyst is typically ethyl aluminum sesquichloride. Other catalsyt systems can also be utilized.

In carrying out the interpolymerization, there is employed a liquid reaction medium, which can be an organic solvent or one of the reactants in liquid form. Purified benzene, xylene, toluene, chlorobenzene, or a similar aromatic solvent is generally utilized, although other solvents can be employed. For efficient operation, care should be taken to exclude oxygen and moisture. The temperature is maintained at room temperature of preferably below, e.g., 20° C. or lower, with temperatures as low as −80° C. or lower being advantageously utilized.

In producing the interpolymer, the catalyst and reactants can all be added initially, or one or more can be added continuously or incrementally. Gaseous reactants are generally fed to the reaction vessel as the polymerization progresses, maintaining saturation of the mixture. Elevated pressures, up to 1000 atmospheres or higher, can be used if desired. The product is usually obtained in solution, and these solutions, after concentration or dilution as desired, can be employed directly in the graft copolymerization. Alternatively, the solid or liquid interpolymer can be isolated and reacted with the ethylenic monomer.

Below are several illustrations of the manner in which the interpolymers employed herein are ordinarily produced:

Interpolymer A

A clean, dry reaction vessel was flushed with nitrogen gas and charged with 10 liters of dried benzene. Ethylene and propylene were passed into the solvent at a rate of 6.0 liters and 12.0 liters per minute, respectively, and there were added 176 milliliters of dicyclopentadiene, 50.4 milliliters of bicyclo[2.2.1]hepta-2,5-diene, and 27.4 milliliters of a 1.4 molar solution of ethyl aluminum sesquichloride in benzene. While maintaining the temperature at about 5° C., 50 milliliters of a 0.02 molar solution of vanadium oxybis(acetylacetonate) in benzene were introduced. The off-gas rate dropped and the ethylene and propylene rates were increased to 10 and 20 liters per minute for 1 minute, during which the off-gas rate again rose. There were then added 10 milliliters of bicycloheptadiene, 35.2 milliliters of dicyclopentadiene, and 50 milliliters of the vanadium oxybis(acetylacetonate) solution. When absorption decreased the above additions were again made, and this was repeated for a total of 6 additions. The polymerization was carried out for a total of 44 minutes from the time of the first vanadium catalyst addition. Methanol was added to the reaction mixture and it was washed with aqueous HCl, and then washed acid free with distilled water. The benzene was stripped at reduced pressure and replaced with about 2 liters of mineral spirits, and stripping continued until the solution had a solids content of about 43 percent and a Gardner-Holdt viscosity of Y—. Infrared analysis of the product showed the absence of free dicyclopentadiene and indicated that the approximate polymer composition was 50 percent ethylene, 20 percent propylene, and 30 percent dicyclopentadiene, all in polymerized form. The intrinsic viscosity of the interpolymer was 0.25 deciliter/gram.

Interpolymer B

A clean and dry reaction vessel was charged with 2.0 liters of dried benzene and sparged with nitrogen for 15 minutes. While passing ethylene and propylene at the rate of 6 liters per minute each into the solution, there were added 35.4 milliliters of dicyclopentadiene, and 10.1 milliliters of bicycloheptadiene. The mixture was cooled to 5° C., and 2.0 milliliters of a 1.2 molar solution of ethyl aluminum sesquichloride in benzene were then added. Cooling was maintained throughout the polymerization, which was initiated by the addition of 4.0 milliliters of a 0.05 molar solution of vanadium tris(acetylacetonate) in benzene. Polymerization began immediately, as evidenced by the rise in the temperature to 8° C. and complete absorption of all gases passing into the solution, i.e., no off-gas could be observed. After about 1 minute, off-gas began to be observed once more; reaction conditions were maintained for 6 minutes after the addition of the vanadium compound, during which time the temperature dropped slowly to 5° C. The reaction was terminated by the addition of methanol, and the reaction mixture was washed first with aqueous HCl and then washed acid-free with distilled water. Benzene was stripped off and replaced with aromatic naphtha (boiling range 150° C. to 170° C.), and stripping was continued until the solution had a solids content of 25.0 percent and a Gardner-Holdt viscosity of E. The intrinsic viscosity of the interpolymer produced was 0.20 deciliter/gram.

Interpolymer C

Following a similar procedure to those described, a copolymer of ethylene and dicyclopentadiene was made from the following reaction mixture:

|  | Milliliters |
|---|---|
| Benzene | 2000 |
| Norbornadiene | 10 |
| Dicyclopentadiene | 40.7 |
| Ethyl aluminum sesquichloride (1.2 molar solution in benzene) | 2.0 |
| Vanadium tris(acetylacetonate) (0.05 molar solution in benzene) | 4 |

The reaction mixture was maintained at about 20° C. and ethylene was passed into the solution at a rate of 12 liters per minute. The product had a solids content of 50 percent and a Gardner-Holdt viscosity of $Z_{10}$. The copolymer obtained had an intrinsic viscosity of 0.24 deciliter/gram.

The unsaturated monomer reacted with the hydrocarbon interpolymer can be essentially any ethylenically unsaturated monomer. Such monomers include monoolefinic and diolefinic hydrocarbons, halogenated monoolefinic and diolefinic hydrocarbons, unsaturated esters of organic and inorganic acids, esters of unsaturated acids, nitriles, amides, unsaturated acids, and the like.

Specific comonomers typically utilized include vinyl aromatic monomers such as styrene, alpha-methyl styrene, vinyl toluene, and mono and di-substituted chlorostyrenes; vinyl halides such as vinyl fluoride and vinyl chloride; polyhaloethylenes such as vinylidene chloride; vinyl esters such as vinyl acetate, vinyl propionate, vinyl butyrate, and isopropenyl acetate; alkyl esters of unsaturated carboxylic acids, such as methyl methacrylate, ethyl acrylate, and other alkyl acrylates and methacrylates having 1 to 20 carbon atoms in the alkyl group, including hydroxyalkyl esters such as hydroxyethyl acrylate, hydroxypropyl acrylate, hydroxyethyl methacrylate, and hydroxypropyl methacrylate; halogenated esters such as methyl alpha-chloroacrylate; unsaturated dicarboxylic acid esters such as dimethyl maleate, dibutyl maleate, dimethyl fumarate, and diethyl fumarate; organic nitriles such as acrylonitrile and crotonitrile; unsaturated carboxylic acid amides, such as acrylamide and methacrylamide, as well as N-substituted derivatives of such amides, such as N-butyl acrylamide, N-methylol acrylamide and N-butoxymethyl acrylamide; and acid monomers such as acrylic acid, methacrylic acid, crotonic acid, 3-butenoic acid, itaconic acid, maleic acid, fumaric acid, butyl hydrogen maleate, sorbic acid, methyl hydrogen fumarate, and other monoesters of maleic, fumaric, and similar acids.

It is to be understood that the above olefinic monomers are representative only, and do not include all of the monomers which may be employed. Further, although the term monomer is used in many instances in this specification, it should be recognized that mixtures of monomers can also be employed if desired.

In carrying out the graft copolymerization reaction, the conditions employed are those at which free-radical initiated addition reactions take place. Thus, there may be employed a free-radical producting catalyst, for example a peroxygen type catalyst, such as a peroxide or hydroperoxide. For instance, benzoyl peroxide and cumene hydroperoxide can be used, as can peroxycarbonates, such as tertiary-butylperoxy isopropyl carbonate, and azo compounds, such as p-methoxyphenyl diazothio(2-naphthyl) ether and alpha,alpha'-azobis(isobutyronitrile). In place of the free radical catalyst, a cationic Friedel-Crafts type catalyst may be utilized, especially with monomers having an electropositive group. Typical catalysts of this type include aluminum chloride, boron trifluoride, titanium tetrachloride, and others. Mixtures of catalysts and redox catalyst systems can also be employed.

A catalyst as such need not always be employed. Heating to sufficiently high temperatures to produce free-radicals or the use of ultra-violet or other radiation can be utilized instead. When a catalyst is used, the quantity can be varied considerably; in most instances it is desirable to utilize from about 0.05 percent to 6 percent of a catalyst such as those above, based on the total weight of monomer and hydrocarbon interpolymer.

The amount of ethylenic monomer (or monomers) utilized in conjunction with the interpolymer is not critical. Even with very small amount, e.g., 0.5 percent or less, of monomer and interpolymer, significant modification of properties can be achieved, depending, of course, upon the particular monomer utilized. On the other hand, in some instances the interpolymer provides only a very small proportion of the total reaction product. In such cases the monomer may in part polymerize independently to form polymer chains not grafted onto the interpolymer, but graft copolymer is also formed and in most cases the product is homogeneous and not easily separated.

Thus, it is seen that the products herein are of several different types, although all are characterized by containing graft copolymer formed by the addition reaction of ethylenic monomers with the above hydrocarbon interpolymers.

In one type a relatively small amount of ethylenic monomer is employed and the resultant product contains predominantly the substantially linear hydrocarbon interpolymer with several grafted units derived from the ethylenic monomer attached to the polymer chain. These grafted units can comprise chains of several or even a large number of monomer molecules, but in many cases a single monomer molecule makes up the grafted unit. This is especially the case with monomers having little or no tendency to homopolymerize, such as beta-substituted olefinic compounds of the type —CH=CH—, e.g. unsaturated dicarboxylic acids, such as maleic acid, maleic anhydride and fumaric acid, and their esters, such as butyl maleate, dimethyl fumarate, methyl butyl fumarate, and the like.

In graft copolymers of this type generally from about 50 to 99.5 percent by weight of the hydrocarbon interpolymer is employed with 0.5 to 50 percent by weight of ethylenic monomer. The products tend to retain the properties of the hydrocarbon interpolymer, which can be modified by selection of the nature and extent of grafted units.

Another valuable type of graft copolymer product produced in accordance with the invention comprises the reaction products in which part of the monomer forms chains which attach to the interpolymer molecule to form graft copolymer and part of the monomer polymerizes independently of the interpolymer. In such cases, the interpolymer is usually in minor proportion and may provide only a small part of the total product, in many cases as little as 1 percent or even less. By regulating the amount of monomer, the mode of reaction, conditions, etc., one can determine in large part the nature of the product, e.g., whether the product consists mainly of graft copolymer consisting of long chains attached to the interpolymer or whether much of the monomer forms independent polymer chains.

This type of polymer mixture is generally obtained with monomers containing a terminal ethylenic group, and which either tend to homopolymerize or to copolymerize with another monomer present. A preferred class of such monomers are the alkyl acrylates and methacrylates having 1 to 20 carbon atoms in the alkyl group. A particularly useful embodiment of the invention, especially with these preferred monomers, is provided by a major proportion of monomer in a solution of the interpolymer in a non-aqueous solvent in which the polymerized monomer is relatively insoluble.

When the reaction is carried out in this manner, the graft copolymer formed stabilizes the dispersion of the polymerized monomer. The product obtained is a stable polymer dispersion of which can be of high solids content and which is quite useful as the vehicle of coating compositions. Suitable solvents include various liquid hydrocarbons, such as aliphatic, aromatic or mixed hydrocarbons. Examples are pentane, n-hexane, cyclohexane, n-heptane, n-octane, isooctane, benzene, toluene, xylene and various mixtures, such as mineral spirits, naphthas and petroleum fractions. The choice of solvent to provide the aforesaid dispersions will depend in part upon the intended reaction conditions and the particular reactants employed. For example, with the preferred acrylic monomers aliphatic hydrocarbons are usually employed.

Set forth below are several examples of the invention, illustrating certain embodiments thereof. It will be understood that the invention is not to be construed as being limited to the details given.

Example 1

A reaction vessel was charged with the following, with the interpolymer employed corresponding to that described above as Interpolymer A:

| | Parts by weight |
|---|---|
| Methyl methacrylate | 20 |
| Interpolymer (43 percent solids) | 35 |
| Aliphatic naphtha (boiling range 63° C. to 69° C.) | 41 |
| V,M & P naphtha boiling range 122° C. to 132° C.) | 34 |
| Benzoyl peroxide | 0.22 |

This mixture was agitated and heated to reflux (about 90° C.) and 0.2 part of isopropyl mercaptan was added. Refluxing was continued for 3½ hours. The product obtained had a solids content of 23.6 percent and a Gardner-Holdt viscosity of A. Based on resin solids obtained, the overall conversion was 87 percent.

A coating of this polymer (2.5 mils wet thickness) on phosphatized steel was baked at 300° F. for 30 minutes. It was clear, hard and colorless, with a Sward hardness (Sward Rocker) of 53. It had good gloss, impact resistance and flexibility, and did not blush after immersion in boiling water for 60 minutes.

Example 2

The following were charged into a reaction vessel:

| | Parts by weight |
|---|---|
| Interpolymer (corresponding to Interpolymer B above; 25 percent solids) | 59.5 |
| Methyl methacrylate | 600 |
| V,M & P naphtha | 225 |
| Aliphatic naphtha (boiling range 63° C. to 69° C.) | 315 |
| Benzoyl peroxide | 2.0 |
| Propanethiol | 2.0 |

The above mixture was refluxed with vigorous stirring for 4 hours and cooled. There was obtained a milky-white, homogeneous dispersion containing dispered polymer having a uniform particle size of 1 to 2 microns. The dispersion had a solids content of 52.5 percent, indicating 100 percent conversion, and did not separate after standing for 1 week or more.

For comparison, the above was repeated but omitting the interpolymer. The polymer formed in hard lumps which coated the sides of the vessel and fouled the stirrer, eventually forcing discontinuation of the reaction at relatively low conversion. It was clearly evident that graft copolymer had formed when the polymerization was carried out in the presence of the interpolymer and that the graft copolymer stabilized the dispersion.

Example 3

A reaction vessel was charged with the following:

| | Parts by weight |
|---|---|
| Interpolymer (corresponding to Interpolymer C above; 50 percent solids) | 100 |
| Methyl methacrylate | 900 |
| Methacrylic acid | 10 |
| n-Heptane | 1500 |
| Benzoyl peroxide | 10 |
| Hexanethiol | 2.5 |

This mixture was agitated and refluxed for 5 hours. A stable dispersion was obtained containing 40.6 percent resin solids. Nearly quantitative conversion (about 99 percent) was realized.

Example 4

Example 3 was repeated except that only one-half as much of the interpolymer was employed. Even slightly better conversion of monomers to polymer was obtained, and the dispersion was again stable and had desirable properties.

Polymeric dispersions such as those described provide very desirable coatings when formulated with conventional pigments, plasticizers and additives and applied to steel or other surfaces and baked. The coatings obtained are hard, adherent and attractive, and are generally comparable to coatings made from the methacrylate lacquers extensively used and in painting automobiles and similar articles.

Example 5

Four solutions were prepared, having the following compositions (in parts by weight):

| | A | B | C | D |
|---|---|---|---|---|
| Vinyl toluene | 16 | 16 | 16 | 16 |
| Ethyl acrylate | 4.3 | 4.3 | 4.3 | 4.3 |
| Acrylic acid | 1.2 | 1.5 | 2.0 | 2.5 |
| Benzoyl peroxide | 0.23 | 0.23 | 0.23 | 0.23 |
| t-Butyl hydroperoxide (60 percent) | 0.36 | 0.36 | 0.36 | 0.36 |

A reaction vessel containing 150 parts of xylene and 46.0 parts of Interpolymer A above (43 percent solids) was heated to reflux (at about 136° C.) and solution A was added to the refluxing solution over a 15 minute period, after which solutions B, C and D were each added in order and each over a similar period. After the final addition was complete, refluxing was continued for 4 hours.

The product was a clear solution having a solids content of 36.6 percent, indicating a monomer conversion of 92 percent. Two mil wet films of this product drawn on phosphatized steel panels provided clear, hard coatings; one such coating after air-drying at room temperature for 66 hours had a Sward hardness of 31, while a similar film which was baked for 30 minutes at 300° F. had a Sward hardness of 48.

Example 6

The following were heated at about 100° C. for 80 minutes:

| | Parts by weight |
|---|---|
| Interpolymer B (25 percent solids) | 40 |
| Monomethyl itaconate | 10 |
| Aromatic naphtha (boiling range 160° C. to 173° C.) | 40 |
| Benzoyl peroxide | 0.4 |

The product was precipitated with methanol, redissolved in benzene and analyzed by infrared spectrophotometric examination, which confirmed that reaction to produce a graft copolymer had taken place.

Example 7

A graft copolymer was prepared by heating the following at 85–90° C. for 2 hours:

| | Parts by weight |
|---|---|
| Interpolymer B (100 percent solids) | 10 |
| 2,4-hexadienoic acid | 10 |
| Aromatic naphtha (boiling range 160° C. to 173° C.) | 40 |
| Methyl ethyl ketone | 25 |
| Benzoyl peroxide | 0.4 |

The product was precipitated, redissolved and analyzed as in Example 6, and it was shown that graft copolymerization had taken place.

Example 8

A solution of 0.21 part of maleic anhydride and 40 parts of aromatic naphtha (boiling range 160–173° C.) was added to 19.3 parts of an interpolymer corresponding to Interpolymer A and containing 43 percent resin solids. This mixture was heated to 130° C. over a thirty minute period and maintained at that temperature for one hour. Unreacted monomer was removed and the product was analyzed by infrared spectrographic analysis which showed that graft copolymerization had taken place with anhydride groups being attached to the hydrocarbon polymer chain.

Example 9

The following mixture was heated at 85° C. for 2½ hours:

| | Parts by weight |
|---|---|
| Interpolymer C (30 percent resin solids in benzene) | 83.4 |
| Vinyl acetate | 6.2 |
| n-Heptane | 56 |
| Benzoyl peroxide | 0.25 |

The reaction mass was cooled to 30° C. and 0.4 part of hydroquinone in one part of a 1-to-1 toluene-ethanol mixture was added, whereupon the temperature rose 5° C. A second such addition produced no temperature increase. The graft copolymer was precipitated in acetone, redissolved in a heptane-toluene mixture and filtered. Infrared spectrometric analyses confirmed that the product was a graft copolymer.

In a manner similar to that illustrated by the above examples, there are produced graft copolymers in accordance with the invention using various other monomers and monomer mixtures of the class described in place of those of the examples. Also other solvents, additives, catalysts and procedures can be employed, so long as addition of unsaturated monomer to the above-described interpolymers is effected.

According to the provisions of the patent statutes, there are described above the invention and what are now considered to be its best embodiments. However, within the scope of the appended claims, it is to be understood that the invention can be practiced otherwise than as specifically described.

What is claimed is:

1. A polymeric composition comprising a graft copolymer formed by the addition reaction of at least one ethylenically unsaturated monomer with a non-rubbery interpolymer of up to 80 percent of a cyclic polyene selected from the group consisting of 1,3-cyclopentadiene, 5-methyl - 1,3 - cyclopentadiene, dicyclopentadiene, tricyclopentadiene and 5-methyl-1,3-cyclopentadiene dimer and at least one monoolefin having a single copolymerizable ethylenic group selected from the class consisting of

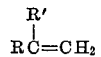

where R is hydrogen or an alkyl group having up to 20 carbon atoms and R' is hydrogen or an alkyl group containing up to 20 carbon atoms, said interploymer having an essentially saturated carbon chain containing a substantial proportion of the total carbon atoms in the polymer molecule, an intrinsic viscosity of 0.6 or lower, and at least about 3.5 percent by weight of ethylenic unsaturation in the polymer molecule.

2. The graft copolymer of claim 1 in which said monomer is an ester of an acrylic acid and an alcohol of 1 to 20 carbon atoms.

3. The graft copolymer of claim 1 in which said monomer is an ethylenically unsaturated dicarboxylic acid or an ester thereof.

4. The graft copolymer of claim 1 in which said cyclic polyene is dicyclopentadiene.

5. The graft copolymer of claim 1 in which at least part of said monoolefin is ethylene.

6. The graft copolymer of claim 1 in which said interpolymer contains ethylene, at least one other monoolefin and dicyclopentadiene.

7. The graft copolymer of claim 6 in which said other monoolefin is propylene.

8. The graft copolymer of claim 1 in which said interpolymer is a copolymer of ethylene and dicyclopentadiene.

9. The graft copolymer of claim 1 in which said interpolymer is produced in the presence of bicyclo hepta-2,5-diene.

10. A graft copolymer in which the molecules are formed by the addition reaction of ethylenically unsaturated monomers with a non-rubbery interpolymer of up to 80 percent of a cyclic polyene selected from the group consisting of 1,3-cyclopentadiene, 5-methyl-1,3-cyclopentadiene, dicyclopentadiene, tricyclopentadiene and 5-methyl-1,3-cyclopentadiene dimer and at least one monoolefin having a single copolymerizable ethylenic group selected from the class consisting of

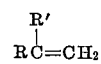

where R is hydrogen or an alkyl group having up to 20 carbon atoms and R' is hydrogen or an alkyl group containing up to 20 carbon atoms, said interpolymer having an essentially saturated carbon chain containing a substantial proportion of the total carbon atoms in the polymer molecule, an intrinsic viscosity of 0.6 or lower, and at least about 3.5 percent by weight of ethylenic unsaturation in the polymer molecule.

11. The graft copolymer of claim 10 in which said ethylenically unsaturated monomers comprise an unsaturated dicarboxylic acid, anhydride or ester.

12. The graft copolymer of claim 11 in which said acid is maleic acid or itaconic acid or an anhydride or ester thereof.

13. A non-aqueous dispersion of an addition polymer of at least one ethylenically unsaturated monomer containing a $CH_2=C$ group stabilized by the presence of the graft copolymer of claim 1, said dispersion being formed by the addition polymerization of said monomers in the presence of a non-rubbery interpolymer of up to 80 percent of a cyclic polyene selected from the group consisting of 1,3-cyclopentadiene, 5-methyl-1,3-cyclopentadiene, dicyclopentadiene, tricyclopentadiene and 5-methyl-1,3-cyclopentadiene dimer and at least one monoolefin having a single copolymerizable ethylenic group selected from the class consisting of

where R is hydrogen or an alkyl group having up to 20 carbon atoms and R' is hydrogen or an alkyl group containing up to 20 carbon atoms, said interpolymer having an essentially saturated carbon chain containing a substantial proportion of the total carbon atoms in the polymer molecule, an intrinsic viscosity of 0.6 or lower, and at least about 3.5 percent by weight of ethylenic unsaturation in the polymer molecule.

14. The dispersion of claim 10 in which said monomer is an ester of acrylic or methacrylic acid and an alcohol of 1 to 20 carbon atoms.

References Cited

UNITED STATES PATENTS

| | | | |
|---|---|---|---|
| 3,260,706 | 7/1966 | Natta et al. | 260—79.5 |
| 3,100,757 | 8/1963 | Smyers | 260—879 |
| 3,211,709 | 10/1965 | Adamek et al. | 260—80.78 |
| 3,236,917 | 2/1966 | Natta et al. | 260—878 |
| 3,271,477 | 9/1966 | Kreste | 260—877 |

MURRAY TILLMAN, Primary Examiner

M. J. TULLY, Assistant Examiner

U.S. Cl. X.R.

204—159.17; 260—31.2, 31.8, 33.6, 78.5, 80.7, 80.78